United States Patent Office 3,158,637
Patented Nov. 24, 1964

3,158,637
PREPARATION OF ESTERS OF ANTI-
MONOUS ACIDS
Burton S. Marks, Palo Alto, Calif., and Blaine O.
Schoepfle, Snyder, N.Y., assignors to Hooker
Chemical Corporation, Niagara Falls, N.Y., a corporation of New York
No Drawing. Filed Sept. 11, 1963, Ser. No. 308,086
6 Claims. (Cl. 260—446)

This invention relates to methods of preparing esters of antimonous acid.

This is a continuation-in-part of our copending application S.N. 79,096, filed November 14, 1960, now abandoned, which was divided from application S.N. 688,108, now U.S. Patent 2,993,924.

It is known that alcohols will react with antimony trichloride to yield the corresponding ester of antimonous acid. Also these esters may be produced by the reaction of metallic derivatives of alcohols with antimony trichloride. Furthermore, β-halo esters of antimonous acid may be synthesized by reacting the appropriate epoxide with antimony trichloride.

However, no general method of reacting antimony trioxide with alcohols without the use of cumbersome dehydrating agents and techniques have been described for the preparation of these esters of antimonous acid.

Accordingly, it is an object of this invention to provide the novel reaction conditions necessary for the preparation of these esters of antimonous acid. It is a further object to provide the necessary reaction conditions, including reactants and physical conditions which will make the preparation of such esters feasible.

As a further object of the present invention are the production of esters of antimonous acid which are useful as flame-retarding additives. Illustrations of the flame retarding effectiveness of the esters of antimonous acid and derivatives thereof prepared in accordance with the teachings of this invention are provided in U.S. Patent 3,031,425. The examples in the patent show the use of said antimony compounds of this invention as flame retarding agents for various types of polymerizable polyester mixtures and also give comparative burning rate data of said mixtures with mixtures which do not employ the flame retardant antimony compounds of this invention.

A further object is the preparation of such esters which are capable of being partially or completely hydrolyzed and condensed with suitable materials to polymeric products suitable for use as film forming materials, impregnants, protective coatings and the like.

Further objects include the production of esters of antimonous acid useful in organic syntheses.

Still further objects and advantages of the present invention will appear from the more detailed description set forth below, it being understood that this more detailed description is given by way of illustration and explanation only, and not by way of limitation, since various changes therein can be made by those skilled in the art, without departing from the scope and spirit of the present invention.

In accordance with the present invention, it has been found that the reaction between alcohols and antimony trioxide can be carried out readily, leading to the progressive formation of alkyl, and aralkyl esters of antimonous acid; with conditions being controlled to determine the characteristics of the product obtained. The esters thus formed are readily prepared and obtained in substantial yields. The alcohol employed can be of the alkyl and aralkyl types, preferably having 7 to 12 carbon atoms, although higher molecular weight alcohols having up to 18 carbon atoms, for example, can readily be used. Among the alcohols which can be used, and which represent the foregoing types are: heptyl, octyl, nonyl, decyl, 2-ethylhexyl, undecyl, benzyl alcohols, lauryl, cetyl, oleyl and the like. The corresponding antimony salts formed from reacting antimony trioxide with the previously listed alcohols are tris(n-heptyl)antimonite, tris(n-octyl)antimonite, tris(n-nonyl)antimonite, tris(n-decyl)antimonite, tris(2-ethylhexyl)antimonite, tris(undecyl)antimonite, tribenzyl antimonite, trilauryl antimonite, tri-cetyl antimonite, and tri-oleyl antimonite.

While the invention has been referred to above by the reaction of individual alcohols with antimony trioxide, mixtures of alcohols can be employed if desired, but control of the process is best carried out as further illustrated below in the examples by the use of individual alcohols. The best controlled mixtures of alcohols used are those which have similar boiling points, e.g. n-octyl and 2-ethylhexyl alcohols.

The antimony reactant employed is antimony trioxide.

The reaction that takes place can be illustrated by that which takes place between antimony oxide and octyl alcohol.

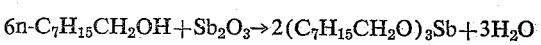

The reaction probably occurs by the stepwise addition of the alcohol to the antimony trioxide, with loss of water until the equivalent of three moles of alcohol have been added per mole of antimony atom. The end of the reaction is signaled by no further evolution of water from the reaction mixture, and complies with the theoretical three moles of water.

In view of the nature of the reaction, at least three equivalents of alcohol are required per equivalent of antimony. In general, however, the reaction is carried out by using a given molar quantity of antimony trioxide which is slurried in a large excess of the particular alcohol employed, for example, up to 25 equivalents of alcohol per equivalent of antimony. This reaction mixture is heated to reflux and maintained thusly while water is split out, removed from the reaction, and collected in a suitable apparatus such as a Dean-Stark or Barrett water-trap. The end of the reaction is denoted by the elimination of the theoretical quantity of water and further by the fact that the reaction will not eliminate additional water on refluxing.

The process is best carried out by the use of excess alcohol as the solvent. However, other unreactive solvents which are of sufficiently high boiling point to allow reaction and its concurrent loss of water can be employed.

The alcohol used must be of sufficiently high boiling point to (1) allow the reaction to go smoothly with the theoretical loss of water, and (2) to remain within the confines of the reaction mixture if an additional solvent other than the alcohol is used. Furthermore, it is best that the alcohol be insoluble or non-miscible with water so that the reaction can be followed easily by noting the quantity of water eliminated.

The alcohols which are employed give the best results in general when their boiling points are at least about 180 degrees centigrade and generally in the range of 190 degrees centigrade and higher. If the particular alcohol employed boils below 180 degrees centigrade, the reaction temperature will necessarily be below 180 degrees centigrade, and the reaction will be sluggish. In general the loss of water is usually noted by the time a reaction temperature of 180 degrees centigrade is reached. The elimination of water is direct and simple, that is, no vacuum or drying agents are required for its removal. This is so because of the high boiling point reactants employed which permits relatively high reaction temperatures. Reaction temperatures usually do not exceed about 300 degrees centigrade, and can readily be maintained below this value by operating under vacuum conditions when the boiling point of the alcohol exceeds 300 degrees centigrade.

The product is obtained from the reaction mixture by the removal of the solvent and this is best accomplished by distillation. Because the solvents that are used are high boiling materials, they are best removed by distillation under reduced pressure, with care to keep the temperature of the product residue sufficiently low to avoid discoloration and decomposition. In order to obtain very high purity product, good purity starting alcohols are used and the reaction is maintained under a dry nitrogen blanket with careful temperature control in the purification step as outlined above. It should be pointed out that since the products are generally heavy viscous, non-distillable oils, which can hydrolyze even in the air, good samples for analysis are difficult to obtain.

As aforesaid, the products or esters of antimonous acid are in general easily hydrolyzed. The lower molecular weight alcohols are esters which in general are more easily hydrolyzed than those obtained from higher molecular weight alcohols.

The following examples illustrate some of the products and processes of the present invention:

*Example 1.—Preparation of Tris(n-Octyl)Antimonite* $(n\text{-}C_7H_{15}CH_2O)_3Sb$ A slurried mixture of 250 milliliters of n-octanol and 29.2 grams of antimony trioxide (0.1 mole) were heated together. At 190 degrees centigrade evolution of water was marked and water continued coming over as the temperature slowly rose. General refluxing was continued for 30 hours during which time water slowly was evolved from the reaction mixture, and collected in a Barrett water trap. The reaction mixture was allowed to cool and then filtered. The filtrate was subjected to vacuum distillation to remove the excess n-octanol. The residue, tris(n-octyl)antimonite was a water-white oil with a slight yellow-green tint. Analyses calculated for $C_{24}H_{51}O_3Sb$: Sb, 23.97. Found: Sb, 23.82.

The yield of tris(n-octyl)antimonite was found to be 80 grams, or about 80 percent of theoretical.

*Example 2.—Preparation of Tris(2-Ethylhexyl)-Antimonite* $(CH_3CH_2CH_2CH_2CH(C_2H_5)CH_2O)_3Sb$ A slurried reaction mixture of 29.2 grams (0.1 mole) of antimony trioxide and 250 milliliters of 2-ethylhexanol was heated to reflux, approximately 186 degrees centigrade. A slow evolution of water was noted. The reaction was allowed to reflux for 48 hours. After refluxing, the reaction mixture was filtered and the filtrate subjected to vacuum distillation to remove the excess 2-ethylhexanol. After distillation there remained a slightly yellow tinted oil, tris(2-ethylhexyl)antimonite. Analysis calculated for $C_{24}H_{51}O_3Sb$: Sb, 23.97. Found: Sb, 23.77.

The yield of tris(2-ethylhexyl)antimonite was found to be 95 grams, or about 93 percent of theoretical.

*Example 3.—Preparation of Tribenzyl Antimonite,* $(C_6H_5CH_2O)_3Sb$

In a 500 milliliter three-necked flask with nitrogen inlet tube, Barrett water trap, condenser, and thermometer was placed 250 milliliters of benzyl alcohol and 29.2 grams (0.1 mole) of antimony trioxide. This same equipment was also used in Examples 1 and 2. The reaction slurry was heated at reflux for varying times from ten to thirty-six hours, whereby most of the water was distilled over. The reaction mixture at the end of the reflux was found to be water-white oil. After filtration the oil was subjected to vacuum distillation to remove the excess benzyl alcohol. The residue, tribenzyl antimonite, was a water-white oil which seemed to yellow slightly on standing.

The yield of tribenzyl antimonite was found to be 86 grams, or about 97 percent of theoretical.

The following examples show the use of the products of the process of the invention in the preparation of pentavalent derivatives.

*Example 4.—Preparation of Tris(n-Octoxy)Antimony Dibromide,* $(n\text{-}C_7H_{15}CH_2O)_3SbBr_2$ To 20.4 grams of tris(n-octyl) antimonite (0.04 mole) was added slowly with stirring and cooling, 6.4 grams of bromine (0.04 mole). The bromine color was rapidly dissipated during the addition giving as a final product a heavy viscous yellow oil, tris(n-octoxy)antimony dibromide.

Analysis calculated for $C_{24}H_{51}O_3SbBr_2$: Sb, 18.25. Found: Sb 17.85.

*Example 5.—Preparation of Tris(2-Ethylhexoxy)Antimony Dibromide,* $(CH_3CH_2CH_2CH_2CH(C_2H_5)CH_2O)_3SbBr_2$ The reaction was carried out in a similar manner to Example 4 using instead antimony 2-ethylhexylate and bromine. A heavy viscous yellow oil, tris(2-ethylhexoxy)-antimony dibromide was obtained.

Analysis calculated for $C_{24}H_{51}O_3SbBr_2$: Sb, 18.25. Found: Sb, 18.60.

*Example 6.—Preparation of Tribenzoxy Antimony Dibromide,* $(C_6H_5CH_2O)_3SbBr_2$ To 22.15 grams of antimony benzylate (0.05 mole) was slowly added with stirring and cooling 8 grams of bromine (0.05 mole). The reaction was vigorous and exothermix, and about halfway through the addition the reaction mixture thickened perceptibly. Benzene was then added in order to reduce the viscosity and the remainder of the bromine was then added. The benzene was vacuum distilled away to yield the dibromide adduct, tribenzoxy antimony dibromide, a heavy viscous, orange oil.

We claim:

1. A process for the preparation of esters of antimonous acid which comprises heating at a temperature of at least about 180 degrees centigrade, antimony trioxide with an alcohol which boils at a temperature of at least about 180 degrees centigrade, and separating the water formed from the reaction media thereby producing said ester of antimonous acid at a yield of at least about 80 percent of theoretical.

2. A process according to claim 1 in which the high boiling alcohol is used in amount greater than that required for complete reaction with the antimony trioxide.

3. The process of claim 1 in which the water is continuously separated from the reaction mixture by distillation.

4. The process of claim 1 wherein the ester is tris(n-octyl) antimonite and the alcohol is n-octanol.

5. The process of claim 1 wherein the ester is tris(2-ethylhexyl)antimonite and the alcohol is 2-ethylhexanol.

6. The process of claim 1 wherein the ester is tribenzyl antimonite and the alcohol is benzyl alcohol.

References Cited in the file of this patent

Mackey, J. Chem. Soc. (London), vol. 95, (1909), pages 604–610.